(12) United States Patent
Watson et al.

(10) Patent No.: US 7,080,101 B1
(45) Date of Patent: Jul. 18, 2006

(54) METHOD AND APPARATUS FOR PARTITIONING DATA FOR STORAGE IN A DATABASE

(75) Inventors: M. Cameron Watson, Santa Monica, CA (US); Pierre Y. Colin, Torrance, CA (US)

(73) Assignee: NCR Corp., Dayton, OH (US)

( * ) Notice: Subject to any disclaimer, the term of this patent is extended or adjusted under 35 U.S.C. 154(b) by 840 days.

(21) Appl. No.: 09/728,852

(22) Filed: Dec. 1, 2000

(51) Int. Cl.
*G06F 17/30* (2006.01)

(52) U.S. Cl. .................. 707/201; 707/200; 711/112

(58) Field of Classification Search ............ 707/2, 707/6, 100, 201, 3, 101, 10, 104, 104.133; 348/607; 702/86; 712/30; 714/4; 711/112, 711/173; 382/243; 709/245; 370/254
See application file for complete search history.

(56) References Cited

U.S. PATENT DOCUMENTS

| | | | | |
|---|---|---|---|---|
| 3,699,318 A | * | 10/1972 | Underkoffler et al. | 702/86 |
| 5,400,371 A | * | 3/1995 | Natarajan | 348/607 |
| 5,640,584 A | | 6/1997 | Kandasamy et al. | 712/30 |
| 5,835,755 A | * | 11/1998 | Stellwagen, Jr. | 707/3 |
| 5,864,842 A | | 1/1999 | Pederson et al. | 707/3 |
| 5,870,746 A | | 2/1999 | Knutson et al. | 707/101 |
| 5,872,904 A | | 2/1999 | McMillen et al. | 714/4 |
| 5,884,299 A | | 3/1999 | Ramesh et al. | 707/2 |
| 5,956,716 A | * | 9/1999 | Kenner et al. | 707/10 |
| 5,983,227 A | * | 11/1999 | Nazem et al. | 707/104.1 |
| 6,014,656 A | * | 1/2000 | Hallmark et al. | 707/2 |
| 6,029,141 A | * | 2/2000 | Bezos et al. | 705/27 |
| 6,061,690 A | * | 5/2000 | Nori et al. | 707/100 |
| 6,141,454 A | * | 10/2000 | Seymour et al. | 382/243 |
| 6,243,361 B1 | * | 6/2001 | McMillen et al. | 370/254 |
| 6,289,334 B1 | * | 9/2001 | Reiner et al. | 707/201 |
| 6,415,286 B1 | * | 7/2002 | Passera et al. | 707/6 |
| 6,507,834 B1 | * | 1/2003 | Kabra et al. | 707/2 |
| 6,532,517 B1 | * | 3/2003 | Wagner et al. | 711/112 |
| 6,580,826 B1 | * | 6/2003 | Sinden | 382/187 |
| 6,631,372 B1 | * | 10/2003 | Graham | 707/5 |
| 6,654,813 B1 | * | 11/2003 | Black et al. | 709/245 |
| 6,678,701 B1 | * | 1/2004 | Garth et al. | 707/201 |
| 2002/0010618 A1 | * | 1/2002 | Pellegrinelli et al. | 705/10 |
| 2002/0138487 A1 | * | 9/2002 | Weiss et al. | 707/10 |
| 2002/0152222 A1 | * | 10/2002 | Holbrook | 707/104.1 |

* cited by examiner

*Primary Examiner*—Jeffrey Gaffin
*Assistant Examiner*—Hassan Mahmoudi
(74) *Attorney, Agent, or Firm*—Trop, Pruner & Hu; Steve Stevens

(57) ABSTRACT

A method and apparatus enables partitioning of data to efficiently store and retrieve data relating to a database system (either a parallel or non-parallel database system). Such partitioning may be performed by receiving information associated with at least one characteristic of the data and performing an algorithm to divide the data into related data segments. The data segments may be stored in a distributive database system based on the characteristic associated with the data.

30 Claims, 4 Drawing Sheets

METHOD AND APPARATUS FOR PARTITIONING DATA FOR STORAGE IN A DATABASE

TECHNICAL FIELD

The invention generally relates to partitioning, storing, and accessing data.

BACKGROUND

One of the key advantages of storing large amounts of data in a database is that a specific subset of the stored data can be retrieved in an organized manner. To learn about customers, businesses are collecting various types of information about their customers, such as personal data, geographic/demographic data, purchasing habits, and so forth. Such customer data are stored in a database system, such as in a relational database management system (RDBMS), where the data can be processed and sorted into a format suitable for reporting or analysis. An example of a database system in which such information is collected is a data warehouse in which data is input from a variety of sources and organized into a format that is structured for query and analysis or reporting. The volume of data collected in a large data warehouse is typically in the gigabyte and sometimes in the terabyte or higher range.

To handle the massive amount of data that is collected and processed in such data warehouses, sophisticated platforms are typically employed. The platforms include parallel processing systems, such as massive parallel processing (MPP) systems or symmetric multiprocessing (SMP) systems. An MPP system typically is a multi-node system having a plurality of physical nodes interconnected by a network. An SMP system typically is a single-node system having multiple processors. Collected data is stored in storage devices in such systems, which are accessible by the various nodes or processors. In a parallel system, stored data portions are accessible in parallel to increase access speeds.

When a particular set of data is sought from a database, several database resources are activated in order to locate the desired data. The database resources that are activated comprise data servers, query execution units, and the like. Often, in order to locate a specific set of data, many storage areas of a database are searched. Searching many locations in the database often involves utilizing many data servers that support the data system, thereby employing a considerable amount of database resources.

Simultaneous queries may be invoked by one or more users who have access to a particular database. Therefore, any one query utilizing a large amount of resources to locate a particular set of data can interfere with the execution of other query requests, which may lead to inefficient usage of the database system.

SUMMARY

In general, a method of partitioning, storing, and accessing data is provided by embodiments of the present invention. Data relating to a database system is received from a remote device. Information associated with at least one characteristic of the data is received from the remote device. The data is partitioned for storage in a database system having plural data storage units based on the characteristic associated with the data. The partitioned data is stored in one or more database system.

In general, an apparatus for partitioning, storing, and accessing data is also provided by embodiments of the present invention. The apparatus provided by embodiments of the present invention comprises: a database; a network connection; and a database controller coupled to the database, wherein the database controller to receive partitioning data and perform a partitioning function upon data received through the network connection based on the partitioning data, and store the partitioned data, the partitioning function identifying a plurality of portions of the database in which a portion of the partitioned data is stored.

Other features and embodiments will become apparent from the following description, from the drawings, and from the claims.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Generally, when data is transmitted from one system to another, such as from a server system to a client system, a certain amount of efficiency in retrieving the data is desired. Often, a database may be accessed by a plurality of users or one user may issue a plurality of queries. Allowing for more efficient access of data from a database can ease the computing congestion that occurs when multiple queries are being processed.

Figure 1:
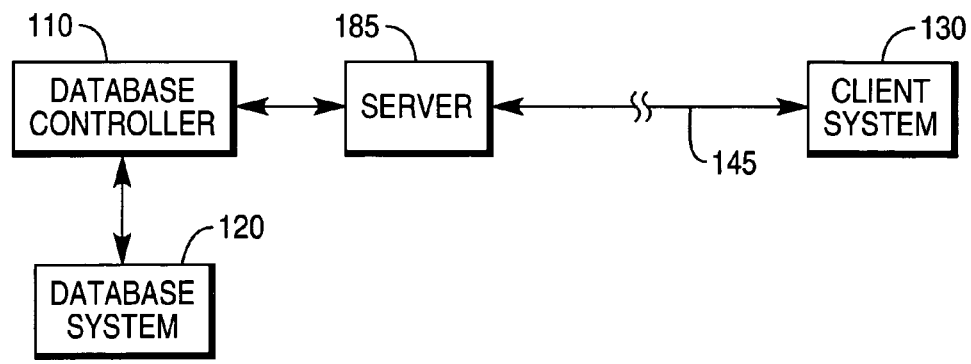
FIG. 1 is a block diagram of an example database communications system, including a database controller, in accordance with an embodiment of the present invention.

One way to improve performance in extracting data from a database is to set up a database such that data is distributed across a plurality of servers, called data servers (e.g. a distributive database system). Partitioning data stored in the database in an efficient manner will improve the utilization of data servers in accessing data in the database. An embodiment that provides a method and an apparatus for partitioning related data and storing them such that a minimum number of data servers are invoked, is provided below. FIG. 1 illustrates a data communication system, which includes a database controller 110 coupled to a database system 120 and a client system 130. The client system 130 can be coupled to the database controller 110 through a server 185 or alternatively, the client system 130 can be coupled directly to the database system 110. In one embodiment, the client system 130 is a remote device. In the illustrated embodiment, the server 185 receives requests from a client, such as Structured Query Language (SQL) queries, to extract data from the database system 120.

The client system 130 is coupled to the server 185 over a network connection 145. The network connection 145 is typically either a private network connection or a public network connection, or a combination of both. A private network connection 145 typically includes local area networks (LANs) or wide area networks (WANs), while one example of a public network connection is the Internet. The types of devices or systems that have access to the communication networks include both wired and wireless devices or systems. Examples of wired devices include personal desktop computer systems that have access to the network connection 145 through dial-up services or other types of data network connection services. Wireless devices (e.g., portable computers with wireless modems, personal digital assistants, mobile telephones) have access to the network connection 145 over wireless infrastructures.

In one embodiment, the database system 120 is a relational database system that employs a database table that contains rows and columns for addressing data in the database system 120. In many cases, the database system 120 uses one or more columns in a database table as the prime key for the database table. When a row address is inserted into the database table, the corresponding column values are hashed in order to determine a data server that is associated with that row and column. This is known as hash partitioning strategy. One consequence of employing the hash partitioning strategy is that data queries that do not specify the prime key adequately may require a search of substantially all of the rows on all data servers that are utilized in a particular database. Embodiments of the present invention provides for partitioning data in a database based upon user inputs, such that a fewer number of data servers are searched in order to locate data.

Figure 2:
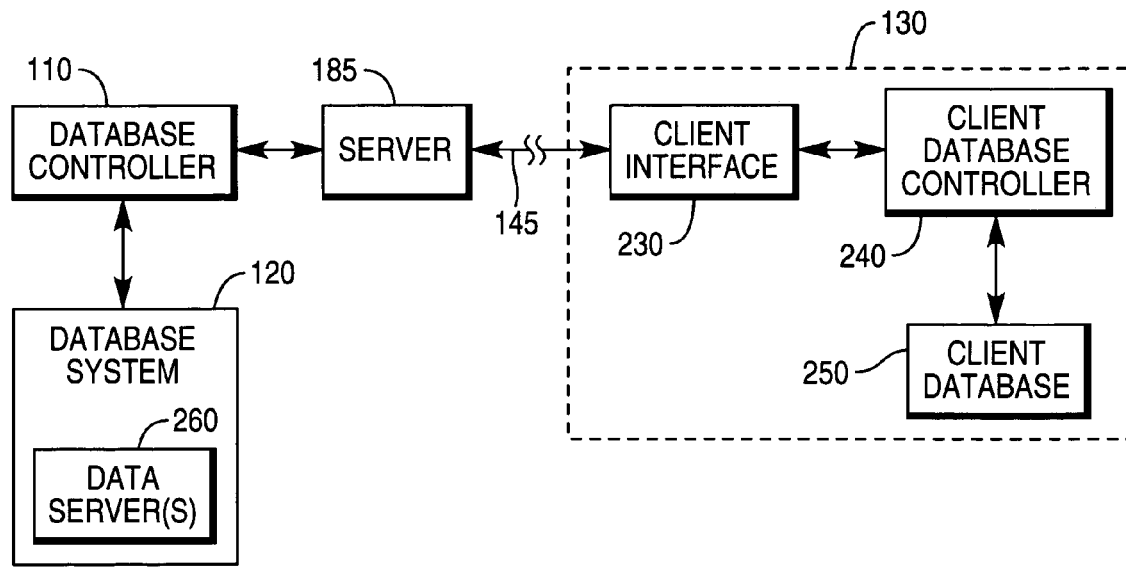
FIG. 2 illustrates a more detailed block diagram representation of the communications system in FIG. 1.

FIG. 2 illustrates a more detailed description of the apparatus shown in FIG. 1. In one embodiment, the database controller 110 is coupled to a server 185. In an alternative arrangement, the database controller 110 can be integrated within the server 185.

The client system 130 comprises a network interface 230, a client database controller 240, and a client database 250. In one embodiment, the client system 130 may initiate query requests, via the network interface 230, to the server 185 via the network connection 145. In an alternative arrangement, the client interface 230, the client database controller 240, and the client database 250 can be integrated within a computer system. When results of query requests are sent back from the database controller 110 to the network interface 230, the network interface 230 sends the data to the client database controller 240, which in turn stores the data in the client database 250.

A user may direct the client system 130 to send information relating to characteristics associated with the data to be stored in the database system 120 to the database controller 110. The database controller 110 can utilize this information to partition the data for efficient storage and access. The client database controller 240 is also capable of collecting data received by the network interface 230 and storing them in a predetermined order into the client database 250. In one embodiment, the client database 250 is a relational database system.

The database system 120 comprises one or more data servers 260 that are capable of addressing corresponding storage locations in the database system 120 to store and retrieve data.

Figure 3:
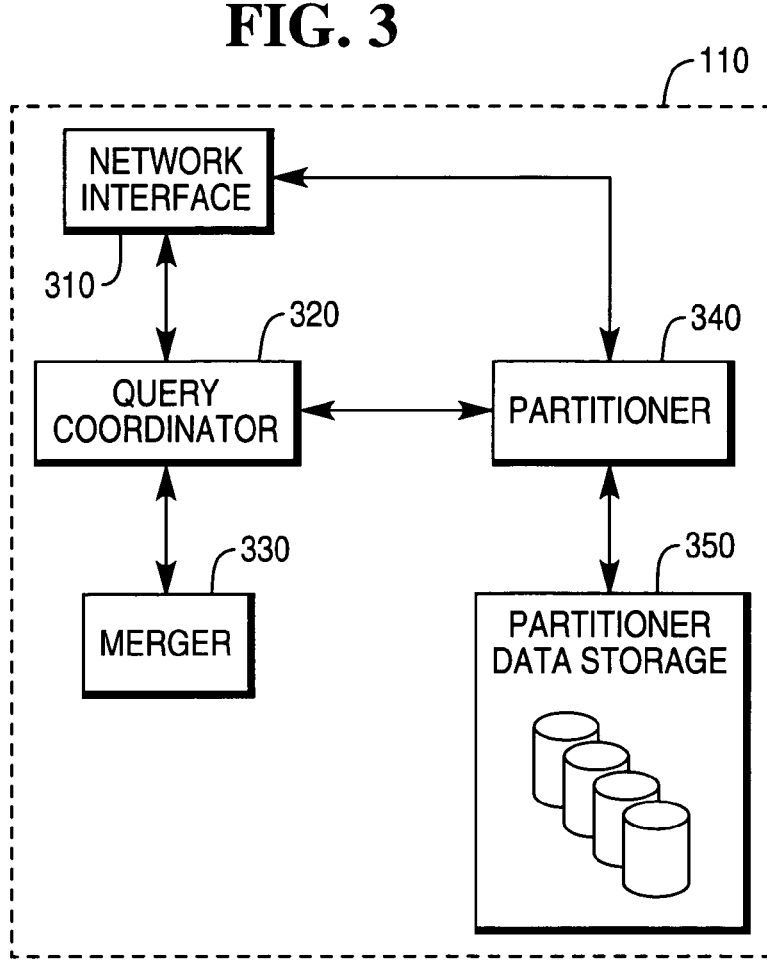
FIG. 3 illustrates a more detailed embodiment of a database controller shown in FIGS. 1 and 2.

FIG. 3 illustrates the database controller 110, which comprises a network interface 310, a query coordinator 320, a merger 330, a partitioner 340, and a partitioner data storage 350. The network interface 310 provides capabilities for communications between the database controller 110 and the network connection 145. Data requests from the client system 130 that are sent via the network connection 145 are received by the network interface 310. Furthermore, data collected from the database system 120 is sent to the client system 130 by the database controller 110. Such data is routed through the network interface 310 onto the network connection 145. Data queries received by the database controller 110 are routed from the network interface 310 to the query coordinator 320. The query coordinator 320 generally chooses one or more data servers 260 within the database system 120 to search for the requested data that is being queried by the client system 130.

In one embodiment, the database system 120 comprises a plurality of data servers 260, such as one hundred data servers 260, within a database system 120. The query coordinator 320, in one embodiment, is responsible for selecting one or more data servers 260 to process the query initiated by the client system 130. The responsibilities of the query coordinator 320 generally include the following: managing database sessions; accepting queries from the client system 130; parsing the received queries; dispatch work steps to the data servers 260; directing the merger 330 to merge query results from the data servers 260; sending back query results to the client system 130; and others.

Using a partitioning algorithm, the partitioner 340 is capable of grouping data that are related, onto one or a limited number of data servers 260. This can reduce the need to search an excessive number of data servers 260 to find the desired data. The partitioner 340 then stores the related data portions in storage units that are under the supervision of one or a limited number of data servers 260. In one arrangement, the client system 130 can control the data-grouping functions of the partitioner 340. In one embodiment, information utilized by the partitioner 340 for performing grouping of data sets is stored in the partitioner data storage 350. The client system 130 can store data into the partitioner data storage 350 for utilization by the partitioner 340.

In one example, the partition algorithm is based upon a multiple straight-line segment approximation of limiting values of a particular data set. For example, a measurement ratio (e.g., weight/height ratios) may have an average value of 3.0, wherein 90% of the values fall between 1.4 and 5.0 and the limiting values are 1.0 and 8.0. An algorithm based upon multiple straight-line segment breakpoints can be used to map pounds-per-inch into partitioning values with a uniform distribution. The partitioner 340 can use the partitioning values to determine which data servers 260 are to be invoked to perform a data storage or a data access. Using an average value, a minimum value, maximum value, and a uniform distribution of a set of data, a straight-line segment partitioning of the data can be defined. Breakpoints are defined to provide plural straight-line segments. The divided segments can be used to logically partition the data to be stored into a database.

The partitioner data storage 350 is a data storage device that is coupled to the partitioner 340. The partitioner data storage 350 is capable of storing information specifying an algorithm that controls the behavior of the partitioner 340.

For example, information relating to the straight-line segmentation algorithm can be stored in the partitioner data storage 350. In another example, the client system 130 can implement a neuro-network structure that can be used by the query coordinator 320 and the partitioner 340 to perform data searches. Coefficients that are related to the neuro-network structure may be stored in the partitioner data storage 350. The coefficients stored in the partitioner data storage 350 can then be recalled by the partitioner 340 in order to perform a narrow field of search in response to a data query. In further embodiments, information relating to other partitioning algorithms can be stored in the partitioner data storage 350, with the partitioning algorithm and information to define the partitioning algorithm generated in the client system 130.

In order to increase efficiency in data searching, the query coordinator 320 uses the partitioner 340 to narrow the scope of a data search in response to the query request. In one embodiment, the partitioner 340 keeps a record of all of the data servers 260 and the types of data that can be addressed by each data server 260. Since the partitioner 340 contains information relating to the type of data that each data server 260 supervises, the partitioner 340, in conjunction with the query coordinator 320, can be used to narrow a field of search for data. Using the information in the partitioner data storage 350, the partitioner 340 is capable of performing an estimating function that includes "guessing" which data server(s) 260 can address the desired data in response to a query.

One of the functions of the query coordinator 320 and the partitioner 340 is to minimize the number of data servers 260 that are addressed in order to perform a data search in response to a query. Without the narrow search capabilities provided by the query coordinator 320 and the partitioner 340, an excessive number of data servers 260 may be addressed in order to perform a data search in response to a data query.

In one embodiment, the database controller 110 creates an index associated with each data server 260. The index includes information (user created) regarding the contents of the rows in the database system 120. The index provides a search element in each data server 260 that can be utilized by the query coordinator 320 to perform a data search. For example, the index can be stored in a column of each table. In other embodiments, the index information is not provided.

In one embodiment, if an index does not exist, the data server controller 110 performs a comparison function, which comprises performing a full-file scan to find the best data match sought by a query. The database controller 110 then builds a spool file containing results from the comparison function. If an index already exists, then the data server uses the index to find the matter and to build a spool file containing the matter results. Once the spool file is built, the query coordinator is notified.

The query coordinator 320 then invokes the merger 330 to select (from the results) a predetermined set of best data matches, such as the best ten data matches. If the matching coefficients are satisfactory, the results are returned to the client system 130. If the results are not satisfactory, then the query coordinator 320 prompts the partitioner 340 to widen the search (such as by increasing the number of selected data servers) and repeat the data search process described above.

Figure 4:
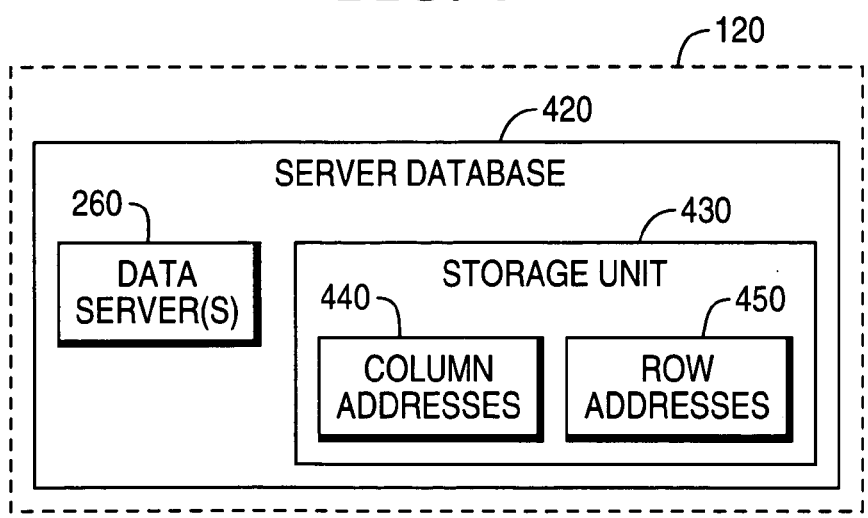
FIG. 4 illustrates a more detailed embodiment of a database system shown in FIGS. 1 and 2.

FIG. 4 illustrates one embodiment of the database system 120. The database system 120, in one embodiment, includes a server database 420, which comprises one or more data servers 260 and a relational database. The database system 120 comprises logic that is capable of providing direction for the data servers 260 within the server database 420, such that the data servers 260 can address specific data stored in the server database 420. The server database 420 also includes a storage unit 430. The storage unit 430 comprises a column address block 440 and a row address block 540. The column address block 440 and a row address block 540 contain column addresses and row addresses that correspond to columns and rows in a relational database structure.

A simplified illustrative example of a data search in accordance with the present invention is described below. For example, using the partitioning method described above, data correlating to six colors, such as red, orange, yellow, green, blue, and purple are stored within the database system 120. In the current example, six data servers 260 address each of the colors stored in the database system 120, respectively. A data query from the client system 130 requests information for the color reddish-orange. This data query is received by the network interface 310 and analyzed by the query coordinator 320. The query coordinator 320, in conjunction with the partitioner 340, performs a data search narrowing function using an algorithm and the organizational information stored in the partitioner data storage 350. The partitioner 340 is then able to make a determination that two particular data servers 260 contain addresses that lead to data related to the colors red and orange. Therefore, the query coordinator 320 selects the data servers 260 that can locate the data correlating to the colors red and orange stored in the database system 120.

In one arrangement, if the data search that is performed in response to the data query does not result in the finding of the data corresponding to reddish-orange color, the field of search is broadened. The field of search is broadened to include other data servers 260 that may have addresses that will lead to data corresponding to the color reddish-orange in the database system 120. With the acquisition of data correlating to the colors red and orange, a determination, with a predetermined percentage confidence (e.g., 98% confidence), can be made that the desired data has been acquired. Once the data search results in the finding of data that is accurate in relation to the query search within a predetermined confidence level, the search by the query coordinator 320 is terminated. The acquired data is sent back to the client system 130 via the network interface 310 and the network connection 145. In one arrangement, the network interface 230 receives the requested data and forwards the data to the client database controller 240 which stores the data into the client database 250.

Figure 5:
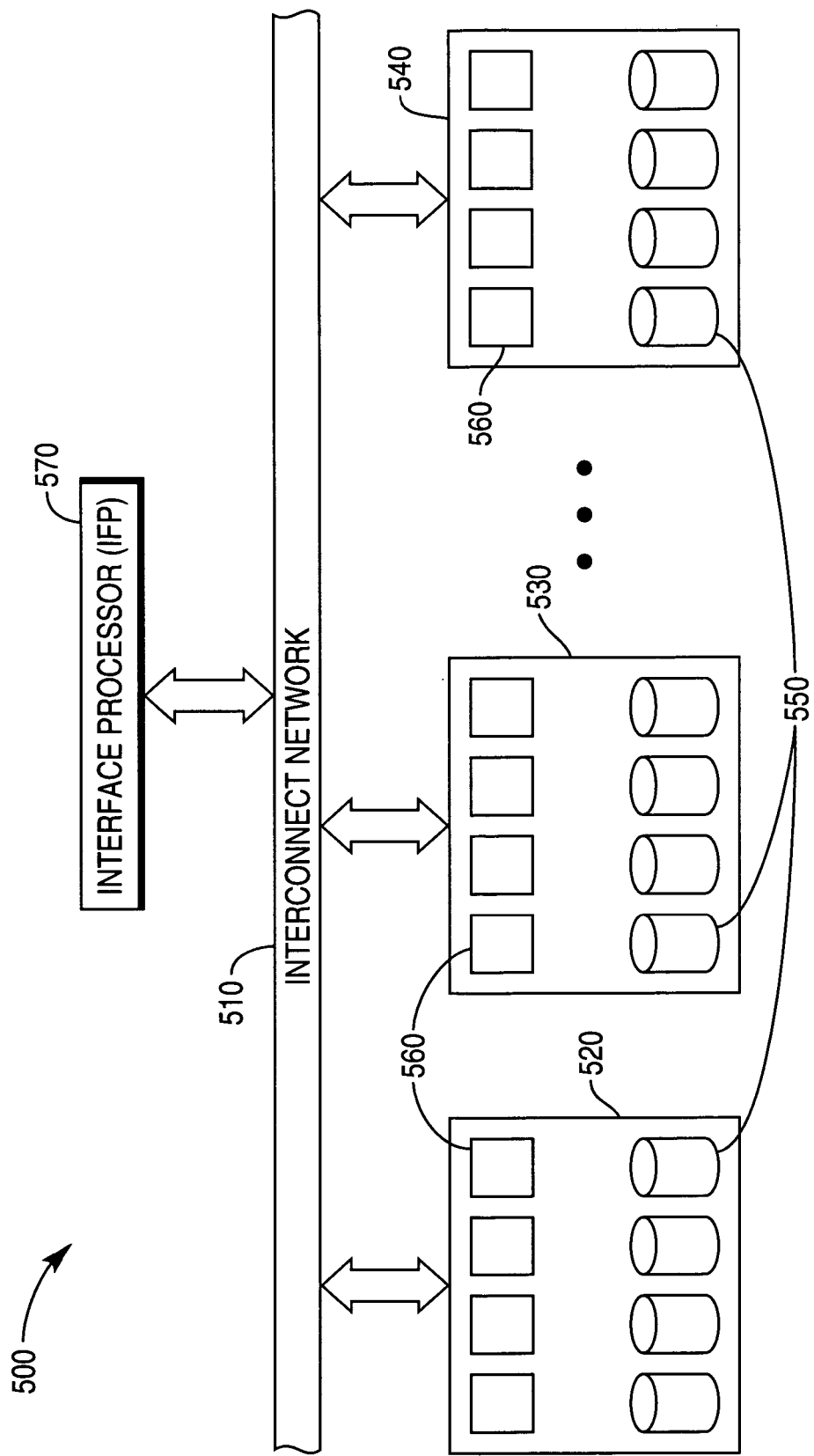
FIG. 5 illustrates an alternative embodiment of a server database shown in FIG. 4.

Turning now to FIG. 5, one embodiment of a parallel database system 500 that can be implemented into the apparatus of the present invention, is illustrated. In one embodiment, the server database 420 is the parallel database system 500 illustrated in FIG. 5. In the illustrative embodiment, the parallel database system 500 is a multi-node parallel system that has a plurality of nodes 520, 530, 540 that are coupled by an interconnect network 510. Each node 520, 530, 540 comprises one or more storage devices 550 and at least one memory storage controller 560. In one embodiment, the interconnect network 510 comprises communication network connections, channels, links, or paths, and systems or devices (such as routers) used to route data over such network connections, channels, links, or paths.

As used here, a "parallel system" refers to a multi-node multi-processing system, a single-node system having plural central processing units (CPUs) 610 (e.g., an SMP system), or a single-node system running multiple virtual processors on one or more CPUs. A "parallel database system" refers to a database system implemented in the parallel system. In one embodiment, the database system is a relational database system that is part of a data warehouse system containing data from a variety of sources and organized for query, analysis, and reporting. The various tables of the parallel database system 500 are stored in the storage devices 550 for access and manipulation by the database controller 110. When the database controller 110 generates a plurality of partition values, the data to be stored in the parallel data system 500 is mapped to one or more nodes. If one node is offline during an attempt to access data, the corresponding "fallback" node is the accessed.

Figure 6:
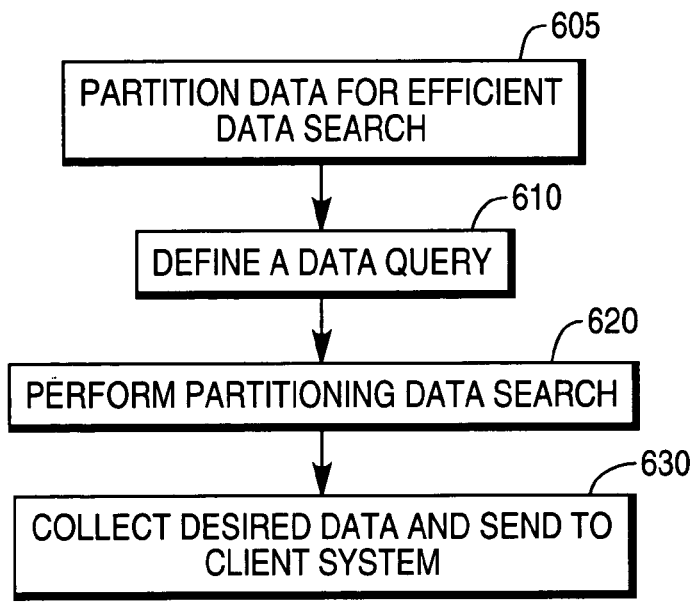
FIG. 6 is a flowchart representation of performing data partitioning and data accessing in accordance with one embodiment of the present invention.

One embodiment of a method for partitioning data and performing a data search in accordance with the present invention is illustrated is FIG. 6. The database controller 110 partitions data into logical groups and stores data under the supervision of one or a limited number of data servers 260 (block 605). In one embodiment, the partitioning of the data is performed by the client system 130. The client system 130 defines a data query in order to retrieve a particular set of data (block 610). A user operating the client system 130 can define a set of macros that characterize the specific data that is desired. The macros are then translated in the client system into query commands, such as Structured Language Query (SQL) statements.

Once a data query is received, the database controller 110 performs a partitioning data search (block 620). The database controller 110 receives query commands through the network interface 310. The query coordinator 320 then implements the query command. The query coordinator 320 uses the partitioner 340, along with the data stored in the partitioner data storage 350, to invoke the data query. Once the partitioning data search step is substantially complete, the database controller 110 collects the desired data and sends the data to the client system 130 (block 630).

Figure 7:
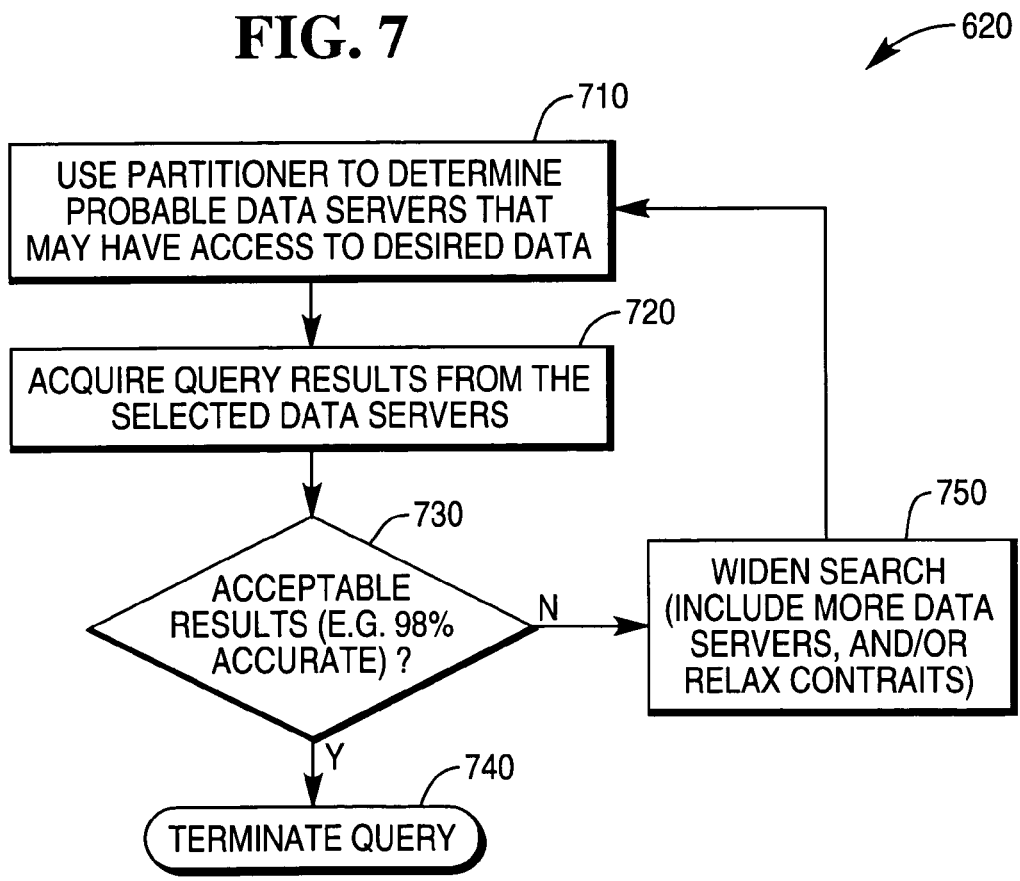
FIG. 7 is a flowchart representation of an act of performing partitioning data search described in FIG. 6.

One embodiment of a detailed flow chart illustrating the steps of performing the partitioning data search (block 620) is shown in FIG. 7. The query coordinator 320 uses the partitioner 340 in order to determine which data servers 260 have a high probability of having the capability of accessing the target data specified by the data query. Using data stored in the partitioner data storage 350, the query coordinator 320 and the partitioner 340 selects one or more data servers 260 that are likely to have access to the data specified by the query (block 710). Referring to the simplified illustrative example described above, if data relating to a particular color from the group of red, orange, yellow, green, blue, and purple is sought by the data query, the database controller 110 selects one or two data servers 260 that may contain the desired data relating to reddish-orange color.

Once one or more data servers 260 that may have access to the desired data are selected, the database controller 110 implements the query commands into the selected data servers 260. The database controller 110 acquires the data query results from the selected data servers 260 (block 720). Referring again to the simplified illustrative example above, if data relating to the color reddish-orange is sought, the data server 260 that contains data relating to the color red and the data server 260 that contains data relating to the color orange return their respective data to the database controller 110.

The database controller 110 acquires the query results and makes a determination whether the acquired data contains acceptable results (block 730). In other words, the database controller 110 determines whether the acquired data is accurate, with respect to the data query, within a certain percentage confidence, such as 98% confidence. If the database controller 110 makes a determination that the acquired data is indeed accurate within a predetermined percentage accuracy, the database controller 110 terminates the data query (block 740).

However, when the database controller 110 makes a determination that the acquired data query results are not accurate within a predetermined percentage confidence level, the database controller 110 widens the data search and the partitioning data search step is re-initiated (block 750). Widening the search comprises the database controller 110 expanding the number of data servers 260 that are invoked in implementing the query commands. In addition to including more data servers 260 to search for the queried data, the database controller 110 may relax the constraints that reflect the accuracy of the acquired data in order to examine more data. The widening of the search (block 750) can be performed by using the coefficients and other instructions stored in the partitioner data storage 350. Once the selected data server 260 returns data relating to the color red and orange, along with data relating to any other color that resembles the color reddish-orange, the data is collected by the database controller 110. The completion of the acts indicated in FIG. 7 substantially completes the act of performing partitioning data search (block 620).

Another example that illustrates a data search in accordance with the present invention is provided below. Consider a relational database table that comprises columns for a name, a social security number, and a fingerprint. For example, a client system 130 queries the name, the corresponding social security number (ssn), and the corresponding fingerprint of a person in which the data query request provides one of the preceding pieces of information and the other two pieces are requested from the database system 120. In order to perform such a data search, the database controller 110 is preprogrammed to accommodate the search requested by the client system 130. One data query may be invoked in the form:

Select name, ssn, match
Where Match(sampleprint)>0.98 and numberRows <=10
Order by match where a match of a sample fingerprints (sampleprint) that is accurate within a 98% confidence level is desired. The above query calls for at least ten rows in the relational database system 120 that contain the data that meets the criterion defined by the data query.

An algorithm can be stored in the partitioner data storage 350 such that the query coordinator 320, in conjunction with the partitioner 340, can utilize the algorithm to perform a data search. The algorithm stored in the partitioner data storage 350 partitions the data into server database 420, such that fingerprint data is partitioned into a number of subsets or "buckets" of approximately equal size. Furthermore, functions that are invocable by the query coordinator 320 are defined. One such function, which partitions fingerprint data, is provided below (the partition function).

bucket=partition (fingerprint, numberBuckets)

The above function returns the bucket in which the specified fingerprint resides, where numberBuckets represents the total number of buckets that contain fingerprint data. The query coordinator 320 invokes the partition function when a row is inserted into the database. Each bucket is generally mapped into one data server. Thus, fingerprint information is stored in the number of buckets specified in numberBuckets, with the buckets mapped to corresponding data servers. A query received by the database controller 110, such as the example select query presented above, may be based upon a certain fingerprint that is inputted into the query request. The query coordinator 320 parses the query and generates an execution plan in order to locate the requested fingerprint information (sampleprint). The query coordinator 320 then calls the following function.

> Handle=Open(sampleprint, numberBuckets)

By invoking the above function, the query coordinator 320 develops a context for identifying the buckets that can be addressed by the various data servers 260 to search for the fingerprints that are good matches for sampleprint. The query coordinator 320 then invokes the following function.

> Bucket=Next(Handle)

By invoking the above function, the query coordinator 320 acquires information relating to a bucket (or data server) to which an execution plan is sent. This function is repeatedly called until a "no-more-bucket" indication is returned, which means no other bucket that could contain the desired fingerprint data is available. At this point, the query coordinator 320 awaits responses from the data server(s) 260 involved in the query. Each response from a data server 260 will include the rows in the relational database system 120 that meet the match criterion (sampleprint) defined by the query. When substantially all of the data servers 260 have responded, the query coordinator 320 calculates the total number of rows that meet the match criterion defined by the query. If the total number of rows is less that the number requested (e.g. ten rows, as requested by the query illustrated above), the query coordinator 320 invokes the following function.

> Repeat=Rewind(Handle)

The query coordinator 320 can use the Rewind function to re-invoke the Handle function. If the function Repeat is true, the query coordinator 320 repeats the previous logic, calling the Next ( ) function, sending steps to data servers, and collecting responses from the data servers 260. As long as the total number of rows that match the criterion defined by the query remains less than the number of rows that was requested, the process described above is repeated. The process described above is repeated until the number of rows that match the criterion defined by the query is obtained, or until all data servers 260 in the database system 120 have participated in the search. In other words, the process described above is repeated until the function Repeat is false. After the data query has been executed, the query coordinator 320 then invokes the following function to terminate the query:

> Close (Handle);

the close function then terminates the Handle function, ending the query.

In one arrangement, when the client system 130 receives the data resulting from the data query from the database controller 110, the client system 130 stores the acquired data in the client database 250. In an alternative arrangement, the data received as a result of the data query may be analyzed by the client system 130. The apparatus and the methods described above can also be implemented to perform data query upon other types of database systems.

The various devices and systems discussed each includes various software layers, routines, or modules. Such software layers, routines, or modules are executable on corresponding control units. The various control units in the devices or systems may each include a microprocessor, a microcontroller, a processor card (including one or more microprocessors or microcontrollers), or other control or computing devices. As used here, a "controller" refers to a hardware component, software component, or a combination of the two.

The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems may be stored in respective storage devices. The instructions when executed by a respective control unit cause the corresponding device or system to perform programmed acts.

The instructions of the software routines, modules, or layers may be loaded or transported to each device or system in one of many different ways. For example, code segments including instructions stored on floppy disks, CD or DVD media, a hard disk, or transported through a network interface card, modem, or other interface device may be loaded into the device or system and executed as corresponding software routines, modules, or layers. In the loading or transport process, data signals that are embodied in carrier waves (transmitted over telephone lines, network lines, wireless links, cables, and the like) may communicate the code segments, including instructions, to the device or system. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method, comprising:
   receiving data to be stored in a database system having plural data servers;
   receiving information associated with at least one characteristic of the data;
   partitioning the data for storage in the database system based on the characteristic associated with the data;
   storing the partitioned data in storage units associated with the plural data servers; and
   in response to a database query, selecting less than all the plural data servers based on the partitioning of the data to reduce a number of data servers involved in processing the database query.

2. The method of claim 1, wherein receiving the information comprises receiving the information from a client system.

3. The method of claim 1, wherein receiving the information comprises receiving at least one of an average value of the data, a uniform distribution of the data, a minimum value of the data, and a maximum value of the data.

4. The method of claim 3, wherein partitioning the data comprises defining straight-line segments based on at least one of the average value of the data, the uniform distribution of the data, the minimum value of the data, and the maximum value of the data.

5. The method of claim 4, wherein partitioning the data further comprises defining breakpoints to provide the straight-line segments.

6. The method of claim 1, wherein partitioning the data for storage in the database system comprises dividing the data into buckets containing related data.

7. The method of claim 1, wherein partitioning the data comprises organizing the data into related portions.

8. The method of claim 7, wherein partitioning the data further comprises executing an algorithm to organize the data.

9. The method of claim 1, wherein storing the partitioned data in the database system comprises storing the partitioned data in a relational database system.

10. The method of claim 1, wherein receiving the information comprises receiving organizational information, and wherein selecting less than all the plural data servers is based on the organizational information.

11. The method of claim 10, wherein selecting less than all the plural data servers is based on the organizational information and a characteristic of data requested by the database query.

12. The method of claim 1, further comprising:
retrieving search results obtained by the selected data servers;
determining whether the search results are satisfactory; and
selecting at least one more data server to process the database query if the search results are not satisfactory.

13. The method of claim 1, wherein partitioning the data comprises partitioning the data into logical groups.

14. The method of claim 1, further comprising storing the information by a partitioner, wherein selecting less than all the data select is performed at least in part by the partitioner.

15. A system, comprising:
a database;
a network interface;
plural storage modules and data servers; and
a database controller coupled to the database, wherein the database controller is adapted to receive partitioning information and perform a partitioning task on data received through the network interface based on the partitioning information to partition the data into plural groups,
the database controller adapted to further store the plural groups of the data partitioned by the partitioning task into plural storage modules associated with corresponding plural data servers,
the database controller adapted to select, in response to a database query, less than all the plural data servers based on the partitioning information to reduce a number of data servers involved in processing the database query.

16. The system of claim 15, wherein the database is part of a parallel database system.

17. The system of claim 15, wherein the database is a relational database.

18. The system of claim 15, wherein the database controller comprises:
a query coordinator coupled to the network interface, the query coordinator to receive the database query from the network interface;
a partitioner to partition data and perform selecting of less than all the plural data servers; and
a partitioner data storage coupled to the partitioner, the partitioner data storage to store the partitioning information associated with at least one characteristic of the data to enable the partitioner to partition data.

19. The system of claim 18, wherein the partitioner is capable of executing an algorithm, based on the stored partitioning information, for partitioning the data.

20. The system of claim 19, wherein the plural data servers are adapted to store and access partitioned data in the database.

21. The system of claim 15, further comprising a client system, wherein the client system sends data to the database through the network interface.

22. The system of claim 21, wherein the client system is adapted to further send the partitioning information to be used by the database controller to partition the data.

23. The system of claim 15, the database controller to select less than all the plural data servers based on the partitioning information and a characteristic of data requested by the database query.

24. The system of claim 15, wherein the selected data servers are adapted to retrieve search results in response to the database query, and the database controller is adapted to determine whether the search results are satisfactory and to select at least one more data server to process the database query if the search results are not satisfactory.

25. An article comprising one or more storage media containing instructions that when executed cause a device to:
receive information associated with at least one characteristic of data to be stored into a database system from a remote device;
partition the data for storage in the database system based on the characteristic of the data;
store the partitioned data in the database system in plural storage modules associated with plural data servers; and
in response to a database query, select less than all the data servers based on the information to reduce a number of data servers involved in processing the database query.

26. The article of claim 25, wherein the instructions when executed cause the device to execute an algorithm to partition the data.

27. The article of claim 25, wherein the instructions when executed cause the device to divide the data into segments containing related data.

28. The article of claim 25, wherein the instructions when executed cause the device to receive information comprising partitioning information.

29. The article of claim 28, wherein the instructions when executed cause the device to select less than all the plural data servers based on the partitioning information and a characteristic of data requested by the database query.

30. The article of claim 25, wherein the instructions when executed cause the device to:
retrieve search results obtained by the selected data servers;
determine whether the search results are satisfactory, and
select at least one more data server to process the database query if the search results are not satisfactory.

* * * * *